(12) United States Patent
Wei et al.

(10) Patent No.: US 11,764,618 B2
(45) Date of Patent: Sep. 19, 2023

(54) WIRELESS CHARGING SYSTEM AND METHOD FOR IMPLEMENTING WIRELESS CHARGING

(71) Applicant: BEIJING XIAOMI MOBILE SOFTWARE CO., LTD., Beijing (CN)

(72) Inventors: Shujun Wei, Beijing (CN); Dongxu Wang, Beijing (CN); Lin Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 159 days.

(21) Appl. No.: 17/147,297

(22) Filed: Jan. 12, 2021

(65) Prior Publication Data

US 2021/0408834 A1    Dec. 30, 2021

(30) Foreign Application Priority Data

Jun. 28, 2020  (CN) .......................... 202010601337.3

(51) Int. Cl.
| | |
|---|---|
| *H02J 50/90* | (2016.01) |
| *H02J 50/40* | (2016.01) |
| *H02J 50/80* | (2016.01) |
| *H02J 50/10* | (2016.01) |
| *H02J 7/02* | (2016.01) |

(52) U.S. Cl.
CPC .............. *H02J 50/402* (2020.01); *H02J 7/02* (2013.01); *H02J 50/10* (2016.02); *H02J 50/80* (2016.02)

(58) Field of Classification Search
CPC ...................................................... H02J 50/90
USPC .......................................................... 320/108
See application file for complete search history.

(56) References Cited

U.S. PATENT DOCUMENTS

| | | | | |
|---|---|---|---|---|
| 2007/0133207 | A1* | 6/2007 | Pryor | F21V 21/35 |
| | | | | 362/253 |
| 2012/0043931 | A1* | 2/2012 | Terao | B60L 53/36 |
| | | | | 320/108 |
| 2019/0207427 | A1* | 7/2019 | McNeally | A47F 10/04 |
| 2019/0238007 | A1* | 8/2019 | Bober | H02K 7/14 |
| 2019/0288567 | A1* | 9/2019 | Kabiri | H01Q 1/288 |
| 2020/0203995 | A1* | 6/2020 | Osada | H02J 50/402 |

OTHER PUBLICATIONS

Extended European Search Report in the European Application No. 21155177.5, dated Jun. 2, 2021, (8p).

* cited by examiner

*Primary Examiner* — Edward Tso
*Assistant Examiner* — Ahmed H Omar
(74) *Attorney, Agent, or Firm* — Arch & Lake LLP

(57) ABSTRACT

A wireless charging system and a method for implementing wireless charging are provided. The wireless charging system includes a bearing surface, a guide rail, a wireless charger, and a driver. On the bearing surface there are multiple regions for placing equipment to-be-charged. The guide rail is located under the bearing surface, and includes a first-direction track. The wireless charger is mounted on the first-direction track under the bearing surface. The wireless charger includes a first slider and a charging circuit. The driver is located under the bearing surface, and includes a first driving circuit connected to the first slider, adapted to changing a location of the wireless charger by driving the first slider to move along the first-direction track.

7 Claims, 10 Drawing Sheets

WIRELESS CHARGING SYSTEM AND METHOD FOR IMPLEMENTING WIRELESS CHARGING

CROSS-REFERENCE TO RELATED APPLICATIONS

This application is based on and claims priority to Chinese Application No. 202010601337.3, filed on Jun. 28, 2020, the disclosure of which is hereby incorporated by reference in its entirety for all purposes.

TECHNICAL FIELD

The present disclosure relates to the technical field of wireless charging, and more particularly, to a wireless charging system and a method for implementing wireless charging.

BACKGROUND

With rapid development of Qi (wireless charging standard)-based wireless charging technology on the current market, charging is implemented at an increasing speed, with increasing user acceptance. However, there are some disadvantages associated with an existing Qi-based charging product, impacting user experiences, such as follows.

Firstly, there is not enough degree of freedom in a plane for wireless charging. A user may have to align a mobile phone with a wireless charging coil to allow charging through a charging panel.

Secondly, the charging panel may have to be placed on a desktop. The desktop may look messy with the charging panel and a cable lying around.

Thirdly, the Qi standard may not support multi-equipment charging. Multiple charging panels may be required if there are multiple equipment on the desktop. Although an existing multi-channel multi-coil mode may support multi-equipment charging, the cost is increased, and an effective charging area is limited.

SUMMARY

Embodiments herein provide a wireless charging system and a method for implementing wireless charging.

According to a first aspect of the present disclosure, a wireless charging system includes a bearing surface, a guide rail, a wireless charger, and a driver. The bearing surface includes multiple regions for placing equipment to-be-charged. The guide rail is located under the bearing surface. The guide rail includes a first-direction track. The wireless charger is mounted on the first-direction track under the bearing surface. The wireless charger includes a first slider and a charging circuit. The driver is located under the bearing surface. The driver includes a first driving circuit. The first driving circuit is connected to the first slider. The first driver changes a location of the wireless charger by driving the first slider to move along the first-direction track.

According to a second aspect of the present disclosure, a method for implementing wireless charging includes: determining, by a controller located under a bearing surface, a location of equipment to-be-charged on the bearing surface; and driving, by a driver located under the bearing surface and according to the location of the equipment to-be-charged, a charging circuit in a wireless charger to move on a guide rail under the bearing surface, such that after the moving, a charging range of the charging circuit covers the location of the equipment to-be-charged.

According to a third aspect of the present disclosure, a non-transitory computer-readable storage medium has stored thereon an instruction which, when executed by a processor of a mobile terminal, allows the mobile terminal to execute the method above for implementing wireless charging.

The above general description and elaboration below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1:
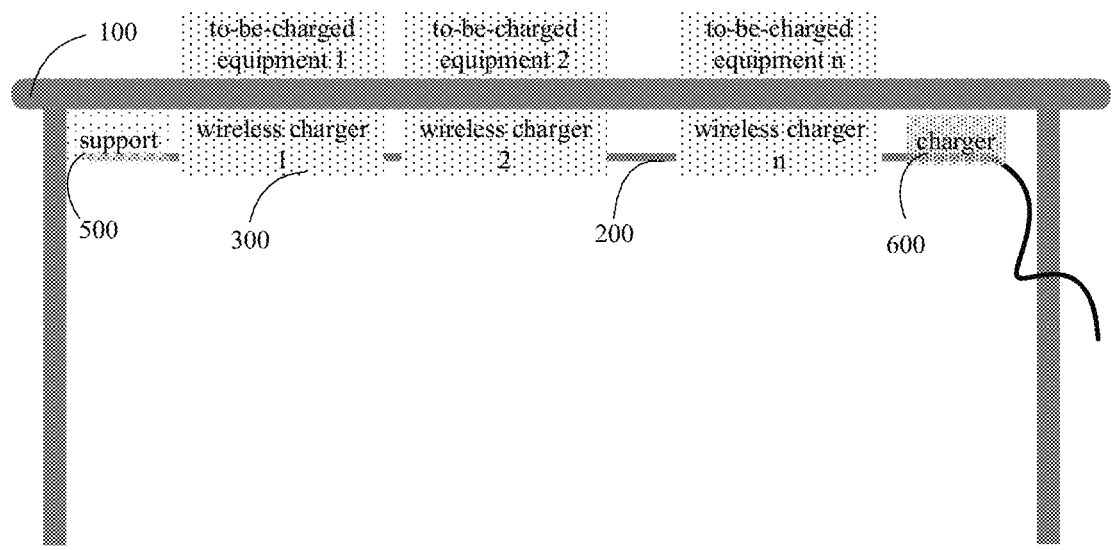
FIG. 1 is a diagram of a structure of a wireless charging system according to an embodiment.

Embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following embodiments do not represent all implementations in accordance with the subject disclosure. Rather, they are mere examples of the equipment and method in accordance with certain aspects of the subject disclosure as recited in the accompanying claims. The implementation modes may take on multiple forms, and should not be taken as being limited to examples illustrated herein. Instead, by providing such implementation modes, embodiments herein may become more comprehensive and complete, and comprehensive concept of the implementation modes may be delivered to those skilled in the art. Implementations set forth in the following embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

FIG. 1 is a diagram of a structure of a wireless charging system according to an embodiment. As shown in FIG. 1, the wireless charging system may include a bearing surface 100, a guide rail 200, a wireless charger 300, and a driver (not shown in the figure). The guide rail 200, the wireless charger 300, and the driver may all be located under the bearing surface.

In some embodiments, the wireless charger 300 may include a wireless charging module, a wireless charging component, or a wireless charging unit. The driver may include a driving module, a driving component, or a driving unit.

In some embodiments, the bearing surface 100 may include multiple regions for placing equipment to be charged. The equipment to be charged may be placed on the multiple regions of the bearing surface 100.

In some embodiments, on the bearing surface 100 there may be multiple regions for placing to-be-charged equipment 101. The guide rail 200 may include a first-direction track 210, referring to FIG. 2. The wireless charger 300 may be mounted on the first-direction track 210 under the bearing surface 100. The wireless charger 300 may include a first slider 310 and a charging circuit 320. The driver may include a first driving circuit 410. The first driving circuit 410 may be connected to the first slider 310. The first driving circuit 410 may be adapted to changing a location of the wireless charger 300 by driving the first slider 310 to move along the first-direction track 210.

In some embodiments, the first slider 310 may include a first slider, a first sliding module, or a first sliding unit. The charging circuit 320 may include a charging component, a charging module, or a charging unit. The first driving circuit 410 may include a first driving module, a first driving component, or a first driving unit.

It is to be understood that there is no limit to the number of wireless charger 300 in the wireless charging system in the embodiment. The wireless charging system may include one or more wireless charger 300. As shown in FIG. 1, the wireless charging system may include a wireless charger 1, a wireless charger 2, . . . , and a wireless charger n. The n may be a positive integer greater than 1.

Figure 2:
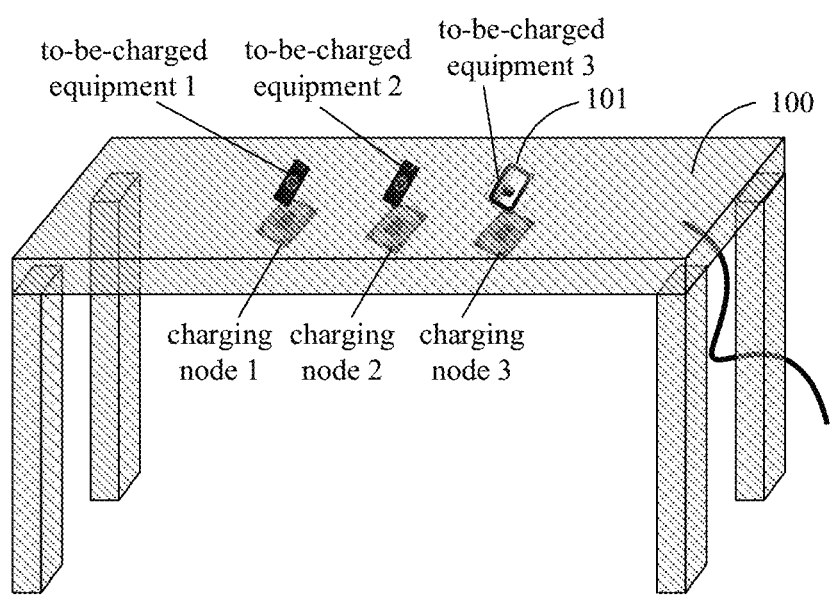
FIG. 2 is a diagram of a structure of a bearing surface according to an embodiment.

It is to be understood that there is also no limit to the number of to-be-charged equipment supported by the wireless charging system in the embodiment. The wireless charging system in the embodiment may support one or more to-be-charged equipment 101. As shown in FIG. 2, the wireless charging system may support simultaneous charging of to-be-charged equipment 1, to-be-charged equipment 2, and to-be-charged equipment 3.

In related art, although there has been a Qi-based charging product placed under a desktop, being-charged equipment still has to be manually placed at a location coinciding a charging panel. Charging may not be performed at any desired location, impacting user experience.

Therefore, with embodiments herein, the whole bearing surface 100 may serve as an effective region for wireless charging. An unlimited number of wireless chargers 300 may support simultaneous charging of multiple equipment on the desktop, as shown in FIG. 2. In addition, the wireless charging system is located under the bearing surface 100. There is no wiring and no charging panel on the bearing surface 100, implementing real free two-dimensional (2D) charging.

Exemplarily, the bearing surface 100 may be a desktop, and may also be an object bearing plane such as a workbench.

With embodiments herein, a wireless charging system is attached beneath a bearing surface 100. To-be-charged equipment 101 on the bearing surface 100 is charged wirelessly. Accordingly, there is no charger and no power cable on the bearing surface 100. Thus, the bearing surface 100 is tidier, facilitating use. To charge to-be-charged equipment, a user may directly place the to-be-charged equipment on the bearing surface 100. The first driving circuit 410 may change the location of the wireless charger 300 by driving the first slider 310 to move along the first-direction track 210, allowing the wireless charger 300 to approach and charge the to-be-charged equipment 101. The user does not have to look for a charger aligned with the to-be-charged equipment, facilitating charging.

In some embodiments, the first driving circuit 410 may be a first driving component, a first driving module, or a first driving unit. The first slider 310 may be a first sliding component, a first sliding module, or a first sliding unit.

In some embodiments, the driving module may be a stepper motor. That is, the first driving circuit 410 may be a stepper motor, such as a permanent-magnet two-phase motor, with a compact volume and stable control. The driving module may also be a linear motor, such as a linear motor, a driving motor, etc., with a high precision, a simple structure, and light weight, reducing the weight of the wireless charging system. A specific structure of the driving module is not limited in the embodiment.

The first slider 310 of the wireless charger 300 may be a metal dome, and may also be a metal collar, etc. For example, the metal dome may be mounted around the first-direction track 210, in electrical connection with the first-direction track 210. For example, the metal collar may be sleeved around the first-direction track 210, in electrical connection with the first-direction track 210. A specific structure of the first slider 310 is not limited in the embodiment.

The guide rail may have to be conductive. Therefore, for safety, in the embodiment, an insulating layer may be provided outside the guide rail, ensuring user safety. The insulating layer may be of material such as a resin, plastic, silicon rubber or Polyvinyl Chloride (PVC), etc., which is not limited thereto in the embodiment.

In the embodiment, the structure is simple. There is no wiring and no charging panel on the bearing surface. The whole bearing surface becomes an effective region for wireless charging, thereby solving the problem of a messy bearing surface caused by charging wiring on various bearing surfaces such as a desktop or a workbench. A wireless charger may move along the guide rail. In this way, the wireless charger is aligned with to-be-charged equipment on the bearing surface by movement of the location and the wireless charger per se. A user is not required to manually align to-be-charged equipment with a charger under a desktop, thereby improving charging efficiency.

Figure 3:
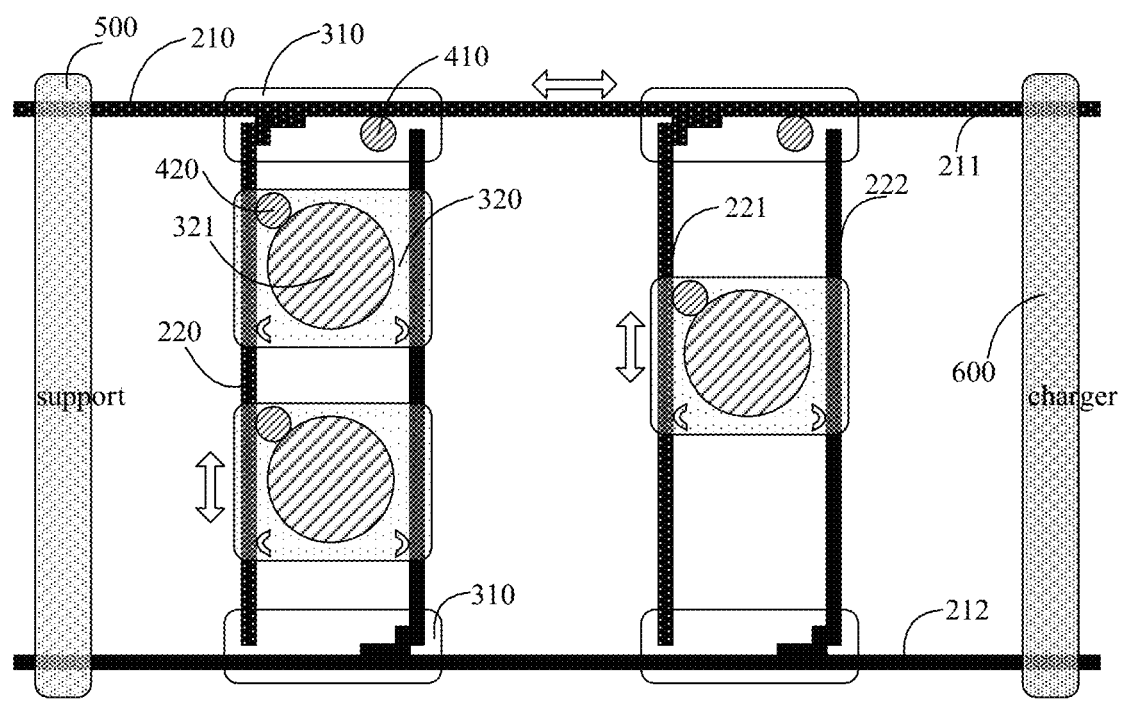
FIG. 3 is a diagram of a structure of a wireless charger according to an embodiment.

In an embodiment, referring to FIG. 3, the guide rail 200 may further include a second-direction track 220.

The second-direction track 220 may be mounted on the first-direction track 210. The charging circuit 320 may be mounted on the second-direction track 220. The first-direction track 210 and the second-direction track 220 may be arranged along different directions.

Here, the second-direction track 220 may slide on the first-direction track 210. The charging circuit 320 may slide on the second-direction track 220.

The second-direction track 220 may be mounted on the first-direction track 210 through a metal dome. The metal dome may be mounted around the first-direction track 210, allowing the second-direction track 220 to slide on the first-direction track 210. The metal dome may also be electrically connected to both the second-direction track 220 and the first-direction track 210, such as by being electrically connected to a cable in the second-direction track 220 and a cable in the first-direction track 210. Accordingly, voltage on the first-direction track 210 may also be passed on to the second-direction track 220.

Of course, the cable in the second-direction track 220 may be directly connected to the cable in the first-direction track 210. Alternatively, the cable arranged along the second-direction track 220 may be connected to the cable arranged along the first-direction track 210. Accordingly, voltage on the first-direction track 210 may also be passed on to the second-direction track 220.

The charging circuit 320 may be connected to the second-direction track 220 through a metal dome. The metal dome may be mounted around the second-direction track 220, allowing the charging circuit 320 to slide on the second-direction track 220. The metal dome may also be electrically connected to a charging coil of the charging circuit 320. Accordingly, voltage on the second-direction track 220 may also be passed on to the charging coil to charge the charging circuit 320, to charge the to-be-charged equipment.

Of course, the cable in the second-direction track 220 may be directly connected to the charging coil of the charging circuit 320. Alternatively, the cable arranged along the second-direction track 220 may be connected to the charging coil of the charging circuit 320. Accordingly, voltage on the second-direction track 220 may also be passed on to the charging coil of the charging circuit 320.

Here, an insulating layer may be provided outside all of the second-direction track 220, the first-direction track 210, and the charging circuit 320, preventing voltage leakage, ensuring user safety.

The first-direction track 210 and the second-direction track 220 may be arranged to intersect each other at an angle. The angle may meet $0<\theta<180°$. For example, the first-direction track 210 and the second-direction track 220 may be arranged to be perpendicular to each other, with the angle being 90°.

Referring to FIG. 3, in the embodiment, the driving module may further include a second driving circuit 420. In some embodiments, the second driving circuit 420 may include a second driving component, a second driving module, or a second driving unit.

The charging circuit 320 may include a second slider (not shown in the figure) and a charging coil 321.

The second driving circuit 420 may be connected to the second slider. The second driving circuit 420 may be adapted to changing a location of the charging coil 321 by driving the second slider to move along the second-direction track 220.

With the first driving circuit 410 and the second driving circuit 420, the charging coil 320 may be allowed to move in different directions, such that the charging coil 320 may gradually approach and charge to-be-charged equipment. A user does not have to manually change the location of the charging coil under the bearing surface or the location of the to-be-charged equipment, facilitating charging.

Both the first driving circuit 410 and the second driving circuit 420 may be stepper motors. The stepper motor on the first-direction track 210 may drive the wireless charger 300 to move in a first direction, such as a horizontal direction. The stepper motor on the second-direction track 220 may drive the charging circuit 320 to move in a second direction, such as a vertical direction.

In an embodiment, the wireless charging system may further include a support 500 and a charger 600.

The support 500 may be adapted to securing the first-direction track 210 under the bearing surface 100. The charger 600 may be secured on one side of the first-direction track 210. The charger may be adapted to powering the wireless charger 300 through the cable in the guide rail or the cable arranged along the guide rail.

The guide rail may be secured through the support 500, such that the wireless charging system may be located under the bearing surface. The charger may be provided at one end, reducing charging cable usage. There is no wiring and no charging panel on the bearing surface, implementing real free 2D charging.

In an embodiment, referring to FIG. 3, the first-direction track 210 may include a first positive track 211 and a first negative track 212. The second-direction track 220 may include a second positive track 221 and a second negative track 222.

The first positive track 211 may be electrically connected to a positive pole of the charger 600. The first negative track 212 may be electrically connected to a negative pole of the charger 600. The second positive track 221 may be electrically connected to the first positive track 211. The second negative track 222 may be electrically connected to the first negative track 212.

The first positive track 211 and the first negative track 212 may support the wireless charger 300 to slide in the first direction, and voltage on the guide rail may exist in form of a positive pole and a negative pole, ensuring safety. The second positive track 221 and the second negative track 222 may support the charging circuit 320 to slide in the second direction, and voltage on the guide rail may exist in form of a positive pole and a negative pole, ensuring safety, increasing life of the charging coil, ensuring user safety.

In an embodiment, the wireless charging system may include at least one wireless charger 300. One wireless charger 300 may include at least one charging circuit 320. A charging circuit 320 may include a charging coil 321.

Figure 4:
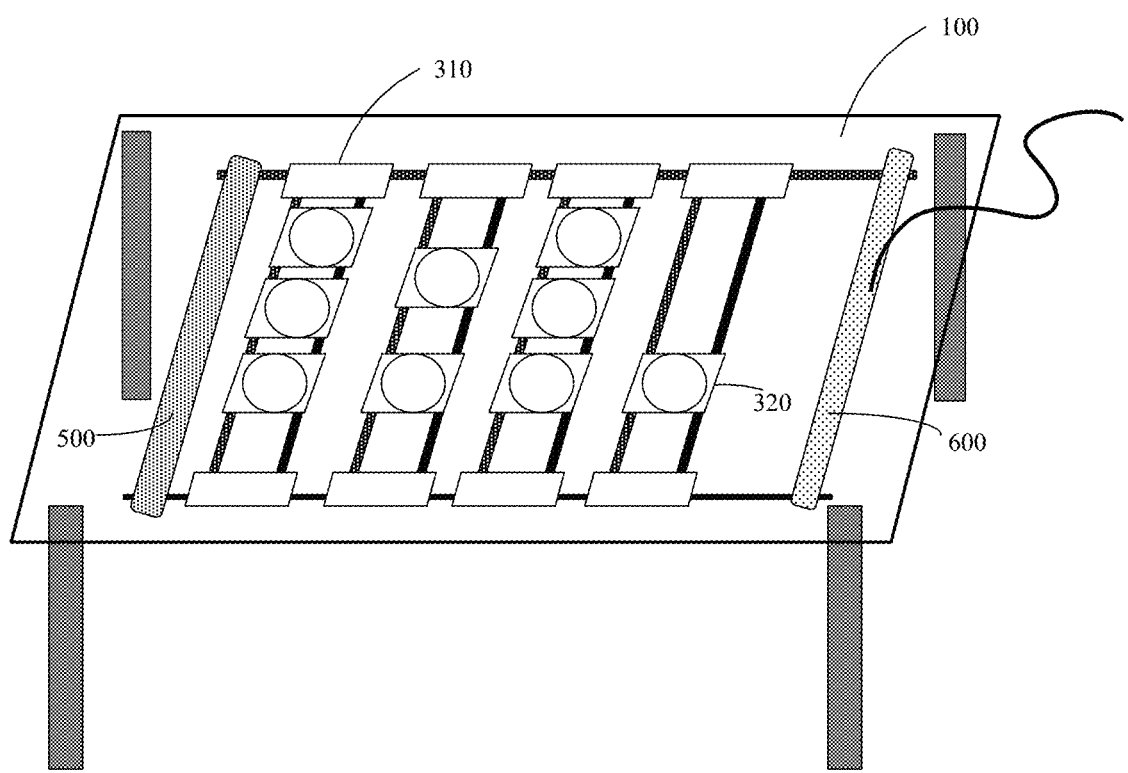
FIG. 4 is a diagram of a structure of a wireless charging system according to an embodiment.

As shown in FIG. 4, the wireless charging system may include four wireless chargers 300. The first wireless charger 300 may include three charging circuits 320. The second wireless charger 300 may include two charging circuits 320. The third wireless charger 300 may include three charging circuits 320. The fourth wireless charger 300 may include one charging circuit 320. That is, there may be nine charging circuits 320 under the bearing surface 100, and each charging circuit 320 may serve to charge one piece of to-be-charged equipment. Therefore, in the embodiment the wireless charging system may support nine charging routes simultaneously.

If the user is to have more equipment charged simultaneously, the number of charging circuits 320 may be increased as needed, increasing flexibility and scalability of the system. In this way, multiple charging circuits 320 form an integral system. When the wireless charging system detects to-be-charged equipment on the bearing surface 100, the wireless charging system may locate the accurate location of the equipment automatically, and automatically move one of the charging circuits 320 beneath the to-be-charged equipment to charge the equipment.

In an embodiment, the wireless charging system may further include a wireless communicator and a controller (both are not shown in the figure). Both the wireless communicator and the controller may be located under the bearing surface 100.

In some embodiments, the wireless communicator may include a wireless communication module, a wireless communication component, or a wireless communication unit. The controller may include a control module, a control component, or a control unit.

The wireless communication module may be adapted to exchanging, with the to-be-charged equipment located on the bearing surface 100, handshake signals for wireless charging. The wireless communication module may include at least three communication nodes located at preset locations not on one straight line.

It is to be understood that locations of the at least three communication nodes are not limited in the embodiment. Once determined, the locations of the at least three communication nodes may remain unchanged. The locations of the at least three communication nodes may not be on one straight line.

The at least three communication nodes each may exchange, with the to-be-charged equipment located on the bearing surface 100, handshake signals for wireless charging, and each may receive a handshake signal for determining the location of the to-be-charged equipment. Exemplarily, the at least three communication nodes may interact with the to-be-charged equipment through a Bluetooth Low Energy (BLE) communication protocol.

The control module may be connected to the driving module and the wireless communication module (the at least three communication nodes), respectively. The control module may be adapted to determining a location of the to-be-charged equipment on the bearing surface 100 according to signal strengths of the handshake signals received by the at least three communication nodes and the preset locations of the at least three communication nodes, and providing the driving module with a driving signal according to the location of the to-be-charged equipment.

The location of the to-be-charged equipment on the bearing surface may be determined according to the signal strengths of the handshake signals received by the at least three communication nodes and the preset locations of the at least three communication nodes as follows.

A distance between the to-be-charged equipment and each of the at least three communication nodes may be determined according to the signal strengths of the handshake signals received by the at least three communication nodes and the preset locations of the at least three communication nodes.

Candidate ranges where the to-be-charged equipment is located may be determined according to center points of where the at least three communication nodes are located as well as the distance between the to-be-charged equipment and each of the at least three communication nodes.

Here, the at least three communication nodes may all be Bluetooth communication nodes, or WiFi nodes. Each communication node may include at least: a receiving antenna adapted to receiving a handshake signal sent by to-be-charged equipment; and a sending antenna adapted to sending the handshake signal to the control module. Then, the control module may determine the location of the to-be-charged equipment according to the signal strengths of the at least three handshake signals and locations of the at least three communication nodes. A specific structure of a communication node is not limited in the embodiment.

An overlapping region of at least three of the candidate ranges may be determined as the location of the to-be-charged equipment on the bearing surface.

Exemplarily, consider a circle with each communication node as a center, and the distance between the to-be-charged equipment to the communication node as a radius. A point of intersection of the three circles may be taken as the location of the to-be-charged equipment on the bearing surface 100.

Figure 5:
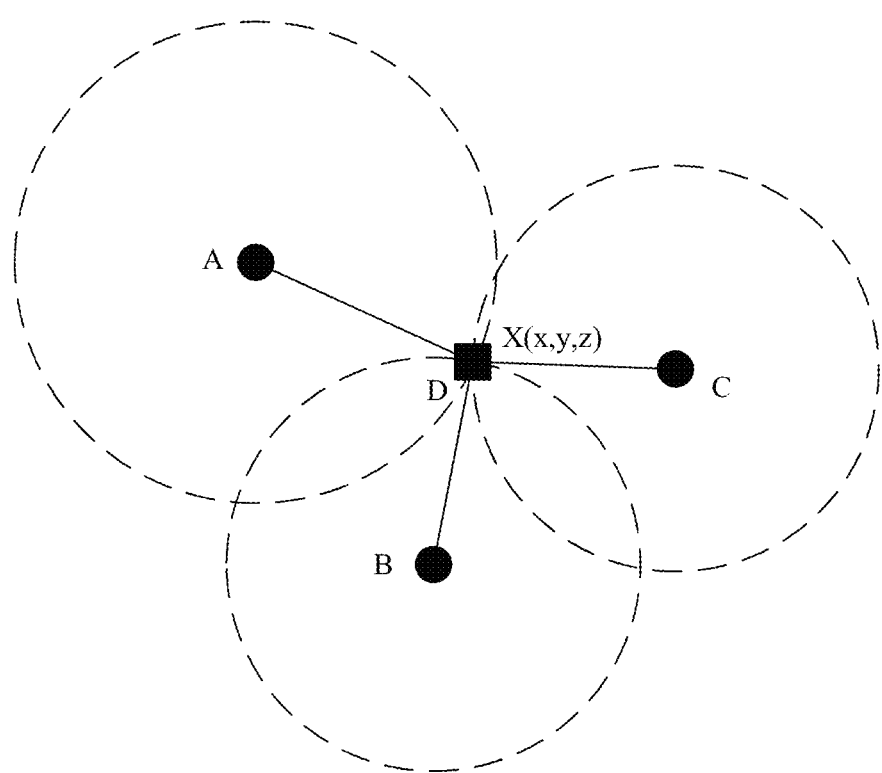
FIG. 5 is a diagram of a principle of locating, by a wireless communication module, to-be-charged equipment according to an embodiment.

Specifically, referring to FIG. 5, a wireless communication module may include a communication node A, a communication node B, and a communication node C. To-be-charged equipment D may send handshake signals to the communication node A, the communication node B, and the communication node C. The communication node A, the communication node B, and the communication node C may send the received handshake signals to a control module.

The control module may determine the distance between the to-be-charged equipment D to each of the three communication nodes according to respective signal strength of the handshake signal received by the each of the three communication nodes and the location of the each of the three communication nodes.

Then, consider a circle with the communication node A as a center, and the distance between the to-be-charged equipment D to the communication node A as a radius; a circle with the communication node B as a center, and the distance between the to-be-charged equipment D to the communication node B as a radius; and a circle with the communication node C as a center, and the distance between the to-be-charged equipment D to the communication node C as a radius. A point of intersection of the three circles may be taken as the location of the to-be-charged equipment on the bearing surface 100, i.e., X (x, y, z).

The control module may provide the driving module with a driving signal according to the determined location X (x, y, z). For example, the driving signal may include controlling a corresponding charging circuit to move leftwards by x units, and move downwards by y units, etc.

The driving module may be adapted to driving, according to the driving signal, at least one wireless charger 300 to move along the guide rail 200. After moving on the guide rail 200, a charging range of at least one charging circuit 320 in the wireless charger 300 may cover the location of the to-be-charged equipment.

Here, by that the charging range after the moving covers the location of the to-be-charged equipment, it means that the charging range of the charging circuit 320 moving on the guide rail 200 covers the location of the to-be-charged equipment. The charging circuit is not necessarily located right under the to-be-charged equipment, as long as the to-be-charged equipment is allowed to receive voltage, increasing a degree of freedom in space for wireless charging.

Exemplarily, referring to FIG. 3, three charging circuits may be located at preset default locations under the desktop. The control module may know the locations of three communication nodes. Having been placed on the desk, to-be-charged equipment may perform locating communication with the three communication nodes through the BLE protocol. The control module may identify the location of the to-be-charged equipment according to the signal strengths of the handshake signals received by the three communication nodes and the locations of the three communication nodes, and send a driving signal to the driving module based on the determined location of the to-be-charged equipment. The driving module may control, according to the driving signal, one charging circuit in the three charging circuits to move automatically, such as first horizontally and then vertically. After the moving, a charging range may cover the location of the to-be-charged equipment, such that the to-be-charged equipment on the desktop may be charged. Charging may stop once the equipment is picked up from the desk, and may continue when the equipment is placed at another location on the desk. Accordingly, the equipment may be maintained at a high battery level.

It is to be understood that an order in which a charging circuit 320 slides is not limited in the embodiment. The first driving component of the driving module may be started first. Then, the second driving component may be started. Or, the second driving component may be started first. Then, the first driving component may be started. Or, the first driving component and the second driving component may be started simultaneously.

In the embodiment, before determining the location of the to-be-charged equipment on the bearing surface 100, it is also necessary to determine whether the to-be-charged equipment is in a charging region, preventing false start of the system caused by a mobile phone being in the vicinity of the desktop.

The charging range of each charging circuit may be acquired, acquiring the charging region. The signal strength of a handshake signal received by the wireless communication module in the charging region may be recorded. When at least one signal strength of a handshake signal meets a preset strength condition, it may be determined that the to-be-charged equipment is placed in the charging region.

Specifically, at least three communication nodes may perform pre-calibration according to an actual coverable charging region. Tables of Bluetooth strength ranges (including an X-direction range, a Y-direction range, and a Z-direction range) of the at least three communication nodes in the charging region may be recorded. It may be determined whether a recorded Bluetooth strength meets a preset strength condition, thereby identifying whether the to-be-charged equipment is on the desktop, as well as whether the to-be-charged equipment is in the charging region, preventing false start of the system caused by a mobile phone being in the vicinity of the desktop.

Exemplarily, the three communication nodes may perform pre-calibration according to an actual coverable charging region. The control module may record tables of Bluetooth strength ranges of the three communication nodes in the charging region, including the Bluetooth strength ranges in the X direction, the Y direction, and the Z direction. If the recorded Bluetooth strength meets the preset strength condition, it may be determined that the to-be-charged equipment is on the desktop and in the charging region, preventing false start of the system caused by a mobile phone being in the vicinity of the desktop, avoiding power waste.

The control module in the embodiment may also exchange, with a preset terminal, handshake signals for wireless charging. The control module may be adapted to providing the driving module with a location driving signal according to the received handshake signals. The driving module may further drive, according to the location driving signal, at least one wireless charger 300 to move along at least one charging circuit 320 in the guide rail 200.

Exemplarily, a user may exchange, with the control module through an application (APP) of a preset terminal according to the BLE protocol, handshake signals for wireless charging. The APP may be adapted to controlling the location of a charging circuit. The control module may receive a handshake signal sent by the APP, and send a location driving signal to the driving module according to the handshake signal. The driving module may control the location of a charging circuit according to the location driving signal. If the user does not set an initial location of the charging circuit, the charging circuit may be placed at a default location according to the control module.

The control module may include a processor, memory, and a communication unit. The memory may be adapted to storing various types of data to support operation on equipment. Example of such data may include instructions of any application or method adapted to operating on the system, such as a control signal, a driving signal, etc. The memory may be realized by any type of volatile or non-volatile storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

A wireless charging system herein may identify the location of to-be-charged equipment on the desktop and charge the equipment. The wireless charging system may locate the to-be-charged equipment on the desktop using the BLE communication protocol. The wireless charging system may be attached beneath the desktop. Three charging circuits may be located at preset default locations below the desktop, as shown in FIG. 3.

A user may control the location of a charging circuit through BLE using an APP. If the initial location of the charging circuit is not set, the charging circuit may be placed at a default location. Having been placed on the desk, to-be-charged equipment may perform locating communication with communication nodes through the BLE protocol. The wireless charging system may move right beneath the to-be-charged equipment automatically according to an identified target location, such that the to-be-charged equipment on the desktop may be charged. Charging may stop once the equipment is picked up from the desk, and may continue when the equipment is placed at another location on the desk. Accordingly, the equipment may be maintained at a high battery level.

In charging node pre-calibration, three charging nodes may perform pre-calibration according to an actual coverable charging region. Tables of Bluetooth strength ranges (including an X-direction range, a Y-direction range, and a Z-direction range) of the three communication nodes in the charging region may be recorded, thereby identifying whether the to-be-charged equipment is on the desktop, as well as whether the to-be-charged equipment is in the charging region, preventing false start of the system caused by a mobile phone being in the vicinity of the desktop.

The location of a communication node may be determined by default. A default rule may be set to avoid the three communication nodes being on one straight line to avoid a locating failure.

The location of to-be-charged equipment may be determined as a point of intersection of three circles including regions of signals sent by three communication nodes located off one straight line according to the Bluetooth signal strength.

After the system is started, when the system finds that equipment enters the charging region, a charging circuit closest to the to-be-charged equipment may be moved toward the to-be-charged equipment to perform wireless charging.

With embodiments herein, a bearing surface 100 becomes a 2D plane where charging can be performed freely, the whole ecological equipment on the bearing surface 100 is no longer bothered by the power cables, taking full advantage of wireless charging, improving user experience. Simultaneous charging of multiple equipment may be supported based on the wireless charging system beneath the bearing surface 100. The number of the wireless chargers 300 or the charging circuits 320 is scalable and may be increased as needed. Each charging circuit 320 may move to the location of to-be-charged equipment automatically. A user is not required to manually align to-be-charged equipment with a charger under a desktop, increasing a degree of freedom in space for wireless charging.

Figure 6:
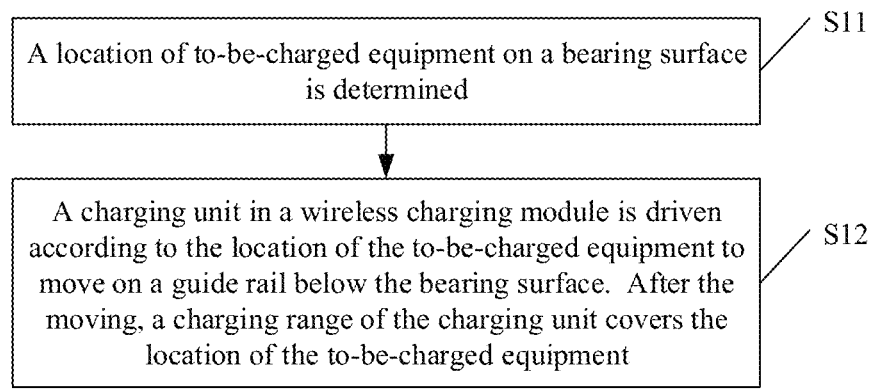
FIG. 6 is a flowchart of a method for implementing wireless charging according to an embodiment.

Based on various embodiments above, embodiments herein further provide a method for implementing wireless charging. FIG. 6 is a flowchart of a method for implementing wireless charging according to an exemplary embodiment. As shown in FIG. 6, the method for implementing wireless charging may include a step as follows.

In S11, a location of to-be-charged equipment on a bearing surface is determined.

In an embodiment, a wireless communication module may include at least three communication nodes located at preset locations not on one straight line.

Figure 7:
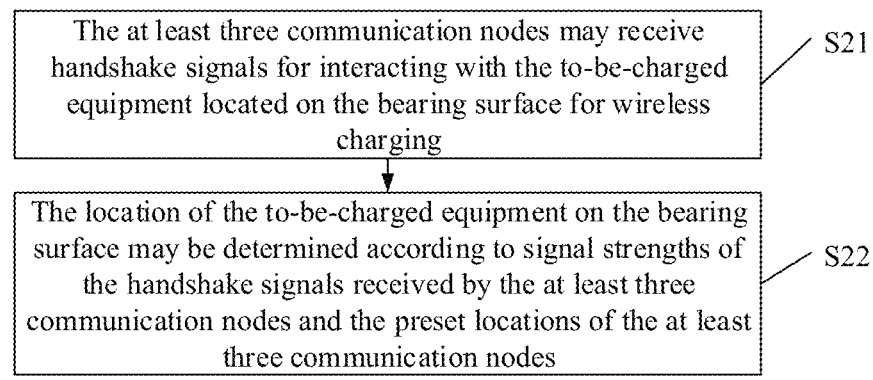
FIG. 7 is a flowchart of implementing S11 according to an embodiment.

Furthermore, referring to FIG. 7, in S11, the location of the to-be-charged equipment on the bearing surface may be determined as follows.

In S21, the at least three communication nodes may receive handshake signals for interacting with the to-be-charged equipment located on the bearing surface for wireless charging.

In S22, the location of the to-be-charged equipment on the bearing surface may be determined according to signal strengths of the handshake signals received by the at least three communication nodes and the preset locations of the at least three communication nodes.

Figure 8:
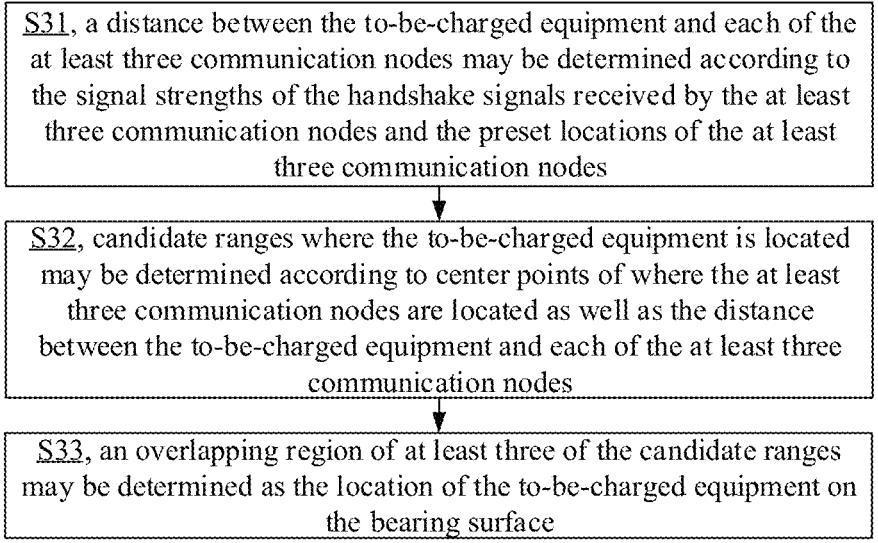
FIG. 8 is a flowchart of implementing S22 according to an embodiment.

In an embodiment, referring to FIG. 8, the location of the to-be-charged equipment on the bearing surface may be determined according to the signal strengths of the handshake signals received by the at least three communication nodes and the preset locations of the at least three communication nodes as follows.

In S31, a distance between the to-be-charged equipment and each of the at least three communication nodes may be determined according to the signal strengths of the handshake signals received by the at least three communication nodes and the preset locations of the at least three communication nodes.

In S32, candidate ranges where the to-be-charged equipment is located may be determined according to center points of where the at least three communication nodes are located as well as the distance between the to-be-charged equipment and each of the at least three communication nodes.

In S33, an overlapping region of at least three of the candidate ranges may be determined as the location of the to-be-charged equipment on the bearing surface.

In S12, a charging unit in a wireless charging module is driven according to the location of the to-be-charged equipment to move on a guide rail under the bearing surface. After the moving, a charging range of the charging unit covers the location of the to-be-charged equipment.

Figure 9:
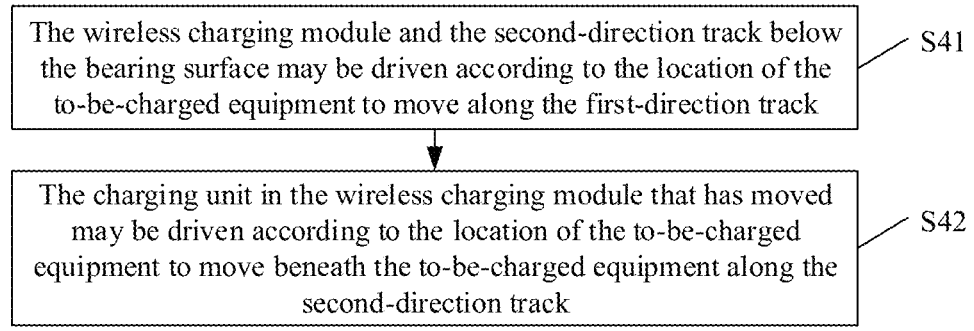
FIG. 9 is a flowchart of implementing S12 according to an embodiment.

In an embodiment, the guide rail may include a first-direction track and a second-direction track. The first-direction track and the second-direction track may intersect each other. Referring to FIG. 9, in S12, the charging unit in the wireless charging module may be driven according to the location of the to-be-charged equipment to move on the guide rail under the bearing surface such that after the moving, the charging range of the charging unit covers the location of the to-be-charged equipment, as follows.

In S41, the wireless charging module and the second-direction track under the bearing surface may be driven according to the location of the to-be-charged equipment to move along the first-direction track.

In S42, the charging unit in the wireless charging module that has moved may be driven according to the location of the to-be-charged equipment to move beneath the to-be-charged equipment along the second-direction track.

With embodiments herein, there is no wiring and no charging panel on the bearing surface, thereby solving the problem of a messy bearing surface caused by charging wiring on various bearing surfaces such as a desktop or a workbench. To-be-charged equipment is placed on the bearing surface. A guide rail is provided under the bearing surface. A wireless charging module may move along the guide rail. In this way, the wireless charging module is aligned with to-be-charged equipment on the bearing surface by movement of the location and the wireless charging module per se, thereby improving charging efficiency.

According to embodiments herein, a non-transitory computer-readable storage medium including instructions may be provided. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A transitory or non-transitory computer-readable storage medium has stored thereon an instruction which, when executed by a processor of a mobile terminal, allows the mobile terminal to execute a method for implementing wireless charging. The method includes:

determining a location of to-be-charged equipment on a bearing surface; and driving, according to the location of the to-be-charged equipment, a charging unit in a wireless charging module to move on a guide rail under the bearing surface, such that after the moving, a charging range of the charging unit covers the location of the to-be-charged equipment.

According to an aspect herein, User Equipment (UE) such as a mobile terminal includes a processor and memory.

The memory is adapted to storing an instruction executable by the processor.

The processor is adapted to implementing a method herein.

Refer to content of a method herein for elaboration of the UE herein, which is not repeated here.

Figure 10:
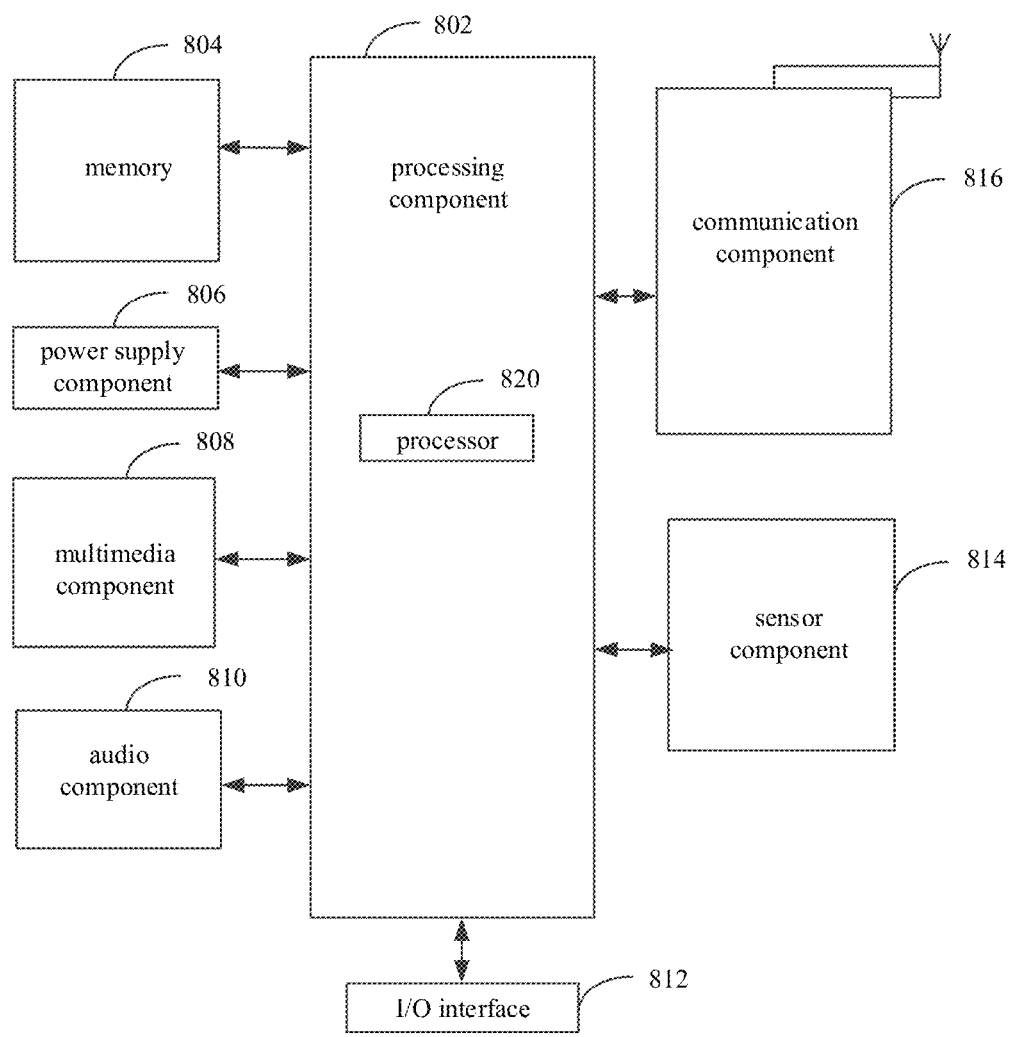
FIG. 10 is a block diagram of UE according to an embodiment.

FIG. 10 is a block diagram of UE according to an exemplary embodiment. For example, the UE may be a mobile phone, a computer, digital broadcast UE, message transceiver equipment, a gaming console, tablet equipment, medical equipment, fitness equipment, a Personal Digital Assistant, etc.

Referring to FIG. 10, the UE may include one or more of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the UE, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 may be adapted to storing various types of data to support the operation at the UE. Examples of such data may include instructions of any application or method adapted to operating on the UE, contact data, phone book data, messages, pictures, videos, etc. The memory 804 may be realized by any type of transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, or a compact disk.

The power supply component 806 may supply electric power to various components of the UE. The power supply component 806 may include a power management system, one or more power sources, and other components related to generating, managing and distributing electricity for the UE.

The multimedia component 808 may include a screen providing an output interface between the UE and a user. The screen may include a Liquid Crystal Display (LCD), a Touch Panel (TP), etc. If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. The multimedia component 808 may include a front camera and/or a rear camera. When the UE is in an operation mode such as a photographing mode or a video mode, the front camera and/or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When the UE is in an operation mode such as a call mode, a recording mode, and a voice recognition mode, the MIC may be adapted to receiving an external audio signal. The received audio signal may be further stored in the memory 804 or may be sent via the communication component 816. The audio component 810 may further include a loudspeaker adapted to outputting the audio signal.

The I/O interface 812 may provide an interface between the processing component 802 and a peripheral interface module. Such a peripheral interface module may be a keypad, a click wheel, a button, and/or the like. Such a button may include but is not limited to: a homepage button, a volume button, a start button, and a lock button.

The sensor component 814 may include one or more sensors for assessing various states of the UE. For example, the sensor component 814 may detect an on/off state of the UE and relative positioning of components such as the display and the keypad of the UE. The sensor component 814 may further detect a change in the position of the UE or of a component of the UE, whether there is contact between the UE and a user, the orientation or acceleration/deceleration of the UE, a change in the temperature of the UE. The sensor component 814 may include a proximity sensor adapted to detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a distance sensor, a pressure sensor, or a temperature sensor.

The communication component 816 may be adapted to facilitating wired or wireless communication between the UE and other equipment. The UE may access a wireless network based on a communication standard such as Wi-Fi, 2G, 3G, 4G, 5G, . . . , or combination thereof. The communication component 816 may broadcast related information or receive a broadcast signal from an external broadcast management system via a broadcast channel. The communication component 816 may further include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The UE may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a transitory or non-transitory computer-readable storage medium including instructions, such as memory 804 including instructions, may be provided. The instructions may be executed by the processor 820 of the UE to implement the method. For example, the computer-readable storage medium may be Read-Only Memory (ROM), Random Access Memory (RAM), Compact Disc Read-Only Memory (CD-ROM), a magnetic tape, a floppy disk, optical data storage equipment, and/or the like.

Herein by "multiple", it may mean two or more. A term "and/or" may describe an association between associated objects, including three possible relationships. For example, by A and/or B, it may mean that there may be three cases, namely, existence of but A, existence of both A and B, or existence of but B. A slash mark "/" may generally denote an "or" relationship between two associated objects that come respectively before and after the mark per se.

Other embodiments of the present disclosure will be apparent to one skilled in the art after he/she has considered the subject disclosure and practiced the invention disclosed herein. The subject application is intended to cover any variation, use, or adaptation of the subject disclosure following the general principle of the subject disclosure and including such departures from the subject disclosure as come within known or customary practice in the art. The subject disclosure and its embodiments are intended to be exemplary only, with a true scope and spirit of the subject disclosure being indicated by the appended claims.

The subject disclosure is not limited to the exact construction that has been described above and illustrated in the accompanying drawings. Various modifications and changes can be made without departing from the scope of the subject disclosure. It is intended that the scope of the subject disclosure be limited only by the appended claims.

What is claimed is:

1. A wireless charging system, comprising:
a bearing surface comprising multiple regions for placing equipment to-be-charged;
a guide rail located under the bearing surface, the guide rail comprising a first-direction track, wherein the guide rail further comprises a second-direction track, the second-direction track is mounted on the first-direction track, and the first-direction track and the second-direction track are arranged along different directions;
a wireless charger mounted on the first-direction track under the bearing surface, the wireless charger comprising a first slider and a charging circuit;
a driver located under the bearing surface, wherein the driver comprises a first driving circuit connected to the first slider, and the first driving circuit changes a location of the wireless charger by driving the first slider to move along the first-direction track; and
a charger, connected to the first-direction track, wherein the charger is disposed on one end of the first-direction track, and the charger powers the wireless charger;
wherein the first-direction track comprises a first positive track and a first negative track, and the second-direction track comprises a second positive track and a second negative track, and
wherein the first positive track is electrically connected to a positive pole of the charger, the first negative track is electrically connected to a negative pole of the charger, the second positive track is electrically connected to the first positive track, and the second negative track is electrically connected to the first negative track;
wherein the wireless charger comprises at least one charging circuit, and each of the at least one charging circuit comprises a charging coil;
wherein the wireless charging system further comprises a wireless communicator and a controller;

wherein the wireless communicator is located under the bearing surface; the wireless communicator exchanges, with the equipment to-be-charged located on the bearing surface, handshake signals for wireless charging; the wireless communicator comprises at least three communication nodes located at preset locations that are not on one straight line;
wherein the controller is located under the bearing surface; the controller is respectively connected to the driver and the wireless communicator; wherein
the controller determines a distance between the equipment to-be-charged and each of the at least three communication nodes according to signal strengths of the handshake signals received by the at least three communication nodes and the preset locations of the at least three communication nodes; wherein the at least three communication nodes comprise a first communication node, a second communication node and a third communication node;
the controller determines a first circle with the first communication node as a center and the distance between the to-be-charged equipment to the first communication node as a radius; determines a second circle with the second communication node as a center and the distance between the to-be-charged communication node as a center and the distance between the to-be-charged equipment to the second communication node as a radius; and determines a third circle with the third communication node as a center and the distance between the to-be-charged equipment to the third communication node as a radius;
the controller determines a point of intersection of the first circle, the second circle and the third circle as the location of the equipment to-be-charged on the bearing surface; and
the controller provides the driver with a driving signal according to the location of the equipment to-be-charged;
wherein the driver drives, according to the driving signal, the wireless charger to move along the guide rail; and after the wireless charger moves on the guide rail, a charging range of the at least one charging circuit in the wireless charger covers the location of the equipment to-be-charged.

2. The wireless charging system of claim 1, wherein the driver further comprises a second driving circuit,
wherein the charging circuit is mounted on the second-direction track, the charging circuit comprises a second slider and a charging coil, and
wherein the second driving circuit is connected to the second slider, and the second driving circuit changes a location of the charging coil by driving the second slider to move along the second-direction track.

3. The wireless charging system of claim 2, further comprising a support,
wherein the support secures the first-direction track under the bearing surface.

4. A method for implementing wireless charging, comprising:
determining, by a controller located under a bearing surface, a location of equipment to-be-charged on the bearing surface; and
driving, by a driver located under the bearing surface and according to the location of the equipment to-be-charged, a charging circuit in a wireless charger to move on a guide rail under the bearing surface; wherein after the moving, a charging range of the charging circuit covers the location of the equipment to-be-charged;

wherein the guide rail comprises a first-direction track and a second-direction track, the second-direction track is mounted on the first-direction track, and the first-direction track and the second-direction track are arranged along different directions;

wherein a charger is connected to the first-direction track, the charger is disposed on one end of the first-direction track, and the charger powers the wireless charger;

wherein the first-direction track comprises a first positive track and a first negative track, and the second-direction track comprises a second positive track and a second negative track, and wherein the first positive track is electrically connected to a positive pole of the charger, the first negative track is electrically connected to a negative pole of the charger, the second positive track is electrically connected to the first positive track, and the second negative track is electrically connected to the first negative track;

wherein a wireless communicator comprises at least three communication nodes located at preset locations that are not on one straight line, wherein determining, by the controller located under the bearing surface, the location of the equipment to-be-charged on the bearing surface comprises:

receiving, by the at least three communication nodes, handshake signals for interacting with the equipment to-be-charged located on the bearing surface for wireless charging;

determining a distance between the equipment to-be-charged and each of the at least three communication nodes according to signal strengths of the handshake signals received by the at least three communication nodes and the preset locations of the at least three communication nodes; wherein the at least three communication nodes comprise a first communication node, a second communication node and a third communication node;

determining a first circle with the first communication node as a center and the distance between the to-be-charged equipment to the first communication node as a radius; determining a second circle with the second communication node as a center and the distance between the to-be-charged equipment to the node as a center and the distance between the to-be-charged equipment to the second communication node as a radius; and determining a third circle with the third communication node as a center and the distance between the to-be-charged equipment to the third communication node as a radius; and determining a point of intersection of the first circle, the second circle and the third circle as the location of the equipment to-be-charged on the bearing surface.

5. The method of claim 4, wherein the first-direction track and the second-direction track intersect with each other, wherein driving, by the driver located under the bearing surface and according to the location of the equipment to-be-charged, the charging circuit in the wireless charger to move on the guide rail under the bearing surface; wherein after the moving, the charging range of the charging circuit covers the location of the equipment to-be-charged comprises:

driving, according to the location of the equipment to-be-charged, the wireless charger and the second-direction track under the bearing surface to move along the first-direction track; and driving, according to the location of the equipment to-be-charged, the charging circuit in the wireless charger that has moved to move to a position beneath the equipment to-be-charged along the second-direction track.

6. A non-transitory computer-readable storage medium, having stored thereon instructions which, when executed by a processor of a mobile terminal, cause the mobile terminal to execute acts comprising:

determining a location of equipment to-be-charged on a bearing surface; and driving, according to the location of equipment the to-be-charged, a charging circuit in a wireless charger to move on a guide rail under the bearing surface; wherein after the moving, a charging range of the charging circuit covers the location of the equipment to-be-charged;

wherein the guide rail comprises a first-direction track and a second-direction track, the second-direction track is mounted on the first-direction track, the first-direction track and the second-direction track are arranged along different directions;

wherein a charger is connected to the first-direction track, the charger is disposed on one end of the first-direction track, and the charger powers the wireless charger;

wherein the first-direction track comprises a first positive track and a first negative track, and the second-direction track comprises a second positive track and a second negative track, and wherein the first positive track is electrically connected to a positive pole of the charger, the first negative track is electrically connected to a negative pole of the charger, the second positive track is electrically connected to the first positive track, and the second negative track is electrically connected to the first negative track;

wherein a wireless communicator comprises at least three communication nodes located at preset locations that are not on one straight line, wherein determining the location of the equipment to-be-charged on the bearing surface comprises:

receiving, by the at least three communication nodes, handshake signals for interacting with the equipment to-be-charged located on the bearing surface for wireless charging;

determining a distance between the equipment to-be-charged and each of the at least three communication nodes according to signal strengths of the handshake signals received by the at least three communication nodes and the preset locations of the at least three communication nodes; wherein the at least three communication nodes comprise a first communication node, a second communication node and a third communication node;

determining a first circle with the first communication node as a center and the distance between the to-be-charged equipment to the first communication node as a radius; determining a second circle with the second communication node as a center and the distance between the to-be-charged equipment to the second communication node as a radius; and determining a third circle with the third communication node as a center and the distance between the to-be-charged equipment to the third communication node as a radius; and determining a point of intersection of the first circle, the second circle and the third circle as the location of the equipment to-be-charged on the bearing surface.

7. The storage medium of claim 6, wherein the first-direction track and the second-direction track intersect with each other, wherein driving, according to the location of the equipment to-be-charged, the charging circuit in the wireless charger to move on the guide rail under the bearing surface comprises:

driving, according to the location of the equipment to-be-charged, the wireless charger and the second-direction track under the bearing surface to move along the first-direction track; and driving, according to the location of the equipment to-be-charged, the charging circuit in the wireless charger that has moved to move to a position beneath the equipment to-be-charged along the second-direction track.

* * * * *